(12) United States Patent
Yoo et al.

(10) Patent No.: US 11,619,271 B2
(45) Date of Patent: Apr. 4, 2023

(54) AXLE ASSEMBLY FOR DRIVING WHEEL OF VEHICLE

(71) Applicants: Hyundai Motor Company, Seoul (KR); Kia Motors Corporation, Seoul (KR)

(72) Inventors: Sung Su Yoo, Gyeonggi-do (KR); Seok Ho Bae, Seoul (KR); Hee Il Kim, Gyeonggi-do (KR); Won Jun Choi, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 219 days.

(21) Appl. No.: 17/102,814

(22) Filed: Nov. 24, 2020

(65) Prior Publication Data

US 2021/0404519 A1 Dec. 30, 2021

(30) Foreign Application Priority Data

Jun. 30, 2020 (KR) .......................... 10-2020-0079869

(51) Int. Cl.
| | |
|---|---|
| *F16D 3/84* | (2006.01) |
| *F16D 3/2245* | (2011.01) |
| *F16D 3/223* | (2011.01) |
| *B62D 7/18* | (2006.01) |
| *B60B 27/00* | (2006.01) |

(52) U.S. Cl.
CPC .......... *F16D 3/845* (2013.01); *F16D 3/2245* (2013.01); *B60B 27/0036* (2013.01); *B62D 7/18* (2013.01); *F16D 2003/22303* (2013.01); *F16D 2003/22309* (2013.01); *Y10S 180/905* (2013.01)

(58) Field of Classification Search
CPC ....... F16D 3/845; B60B 27/0036; B62D 7/18; Y10S 180/905
USPC .......................... 180/255, 256; 464/173, 178
See application file for complete search history.

(56) References Cited

U.S. PATENT DOCUMENTS

| | | | | |
|---|---|---|---|---|
| 1,396,102 | A * | 11/1921 | Dunham .............. | B60K 17/306 180/255 |
| 3,255,839 | A * | 6/1966 | Goldman .............. | B60K 17/306 464/175 |
| 7,419,434 | B2 * | 9/2008 | Wormsbaecher .... | B60K 17/344 464/178 |

(Continued)

FOREIGN PATENT DOCUMENTS

| | | |
|---|---|---|
| JP | 4550986 B2 | 9/2010 |
| KR | 10-1867686 B1 | 6/2018 |
| KR | 10-1916516 B1 | 11/2018 |

*Primary Examiner* — Greg Binda
(74) *Attorney, Agent, or Firm* — Fox Rothschild LLP

(57) ABSTRACT

An axle assembly for a driving wheel of a vehicle allows a wheel-side joint and a shaft to be rotated separately from a boot while driving so as to prevent generation of friction noise of the boot. The axle assembly includes the shaft rotated by receiving driving force from a powertrain; an axle housing disposed to pass through a center of a steering knuckle connected to a steering apparatus; a wheel bearing mounted between the steering knuckle and the axle housing; a joint bearing mounted on an outer part of the shaft; and a boot unit configured to have a first end coupled to an outer race of the joint bearing and a second end coupled to an outer race of the wheel bearing so as to form a space filled with a lubricant outside the shaft.

10 Claims, 7 Drawing Sheets

(56) References Cited

U.S. PATENT DOCUMENTS 10,260,569 B2    4/2019  Hirukawa et al.

* cited by examiner

US 11,619,271 B2

AXLE ASSEMBLY FOR DRIVING WHEEL OF VEHICLE

CROSS-REFERENCE TO RELATED APPLICATION

This application claims under 35 U.S.C. § 119(a) the benefit of Korean Patent Application No. 10-2020-0079869 filed on Jun. 30, 2020, the entire contents of which are incorporated herein by reference.

BACKGROUND

(a) Technical Field

The present disclosure relates to an axle assembly for a driving wheel of a vehicle, more particularly, to the axle assembly for the driving wheel which may reduce noise due to folding of a boot of a drive shaft.

(b) Description of the Related Art

In general, a drive shaft serves to transmit driving force between a powertrain and a wheel of a vehicle.

The drive shaft generally includes two constant velocity joints and one shaft configured to connect the two constant velocity joints in order to absorb changes in angle and distance due to behavior of a suspension system. A boot filled with grease for allowing parts inside the constant velocity joint to move smoothly is mounted on the constant velocity joint.

FIG. 1 (RELATED ART) is a perspective view illustrating a conventional axle assembly for a driving wheel using a drive shaft, and FIG. 2 (RELATED ART) is a view illustrating a state in which an angle is formed between a joint outer race and a shaft of the drive shaft when turning while driving.

As shown in FIG. 1, the conventional axle assembly includes a steering knuckle 10 connected to a steering apparatus of a vehicle, a wheel hub 30 coupled to an inside of the steering knuckle 10 through a hub bearing 20, a wheel disc 40 fixed to an outer circumferential surface of the wheel hub 30 through bolts 34, a drive shaft 50 passing through a center of the wheel hub 30 and spline-coupled to an inner circumferential surface of the wheel hub 30, and a hub nut 32 configured to fix the drive shaft 50 to the wheel hub 30.

The drive shaft 50 is configured to transmit a driving force of a powertrain to the driving wheel. In particular, the drive shaft 50 is an assembly including a wheel-side joint 52, a powertrain-side joint 54, a shaft 54, and a boot 58.

Here, the shaft 56 connects the wheel-side joint 52 and the powertrain-side joint 54. Further, the boot 58 is formed in a corrugated pipe structure which is deformable under driving conditions in which a large angle between an outer race 52a of the wheel-side joint 52 and the shaft 56 is formed, where one end of the boot 58 is fixed to the outer race 52a of the wheel-side joint 52, and the other end of the boot 58 is fixed to the shaft 56.

The wheel-side joint 52 is an assembly including the outer race 52a, an inner race 52b, balls 52c, and a cage 52d.

The outer race 52a is connected to the inner race 52b through the balls 52c and thus receives rotating force from the inner race 52b, and the inner race 52b is coupled to the shaft 56 so as to be rotated integrally with the shaft 56 and thus receives driving force (rotating force) from the powertrain. Further, the outer race 52a has a shaft-type hub coupling part 52a' which passes through the center of the wheel hub 30 and is spline-coupled to an inner circumferential surface of the wheel hub 30.

Therefore, when turning while driving, the wheel hub 30 and the outer race 52a of the wheel-side joint 52 integrally move corresponding to movement of the steering knuckle 10, and accordingly, an angle is formed between the outer race 52a of the wheel-side joint 52 and the shaft 56 under the conditions in which the outer race 52a of the wheel-side joint 52 and the shaft 56 are rotated. Here, the boot 58 is rotated integrally with the outer race 52a of the wheel-side joint 52 and the shaft 56.

When the angle is generated between the outer race 52a of the wheel-side joint 52 and the shaft 56, peaks (between troughs) of the boot 58 come into contact with each other due to the properties of the corrugated pipe structure thereof, and a lubricant on a surface of the boot 58 causes smooth slip between the peaks of the boot 58 and thus prevents generation of noise caused by friction between the peaks of the boot 58.

However, if the lubricant is removed from the surface of the boot 58 or if the lubricant does not function properly due to foreign substances (for example, soil, moisture, a deicing agent, etc.) while driving, sticking of the boot 58 occurs and thus stick-slip noise is generated due to relative movement on a contact surface between the peaks of the boot 58.

That is, if the lubricant is removed from the surface of the boot 58 or if the lubricant does not function properly, when turning while driving, friction noise due to folding of the boot 58 may occur.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an axle assembly for a driving wheel of a vehicle which allows a wheel-side joint and a shaft to be rotated separately from a boot while driving so as to prevent generation of friction noise of the boot.

In one aspect, the present disclosure provides an axle assembly for a driving wheel of a vehicle including a shaft rotated by receiving driving force from a powertrain, an axle housing disposed to pass through a center of a steering knuckle connected to a steering apparatus, and coupled to the shaft through a joint so as to be rotated integrally with the shaft, a wheel bearing mounted between the steering knuckle and the axle housing, a joint bearing mounted on an outer part of the shaft so as to be spaced apart from the joint by a designated distance, and a boot unit configured to have a first end coupled to an outer race of the joint bearing and a second end coupled to an outer race of the wheel bearing so as to form a space filled with a lubricant outside the shaft.

In a preferred embodiment, the wheel bearing may include a wheel bearing outer race coupled to the steering knuckle, a wheel bearing inner race mounted on an outer circumferential part of the axle housing, and a plurality of wheel bearing balls rotatably disposed between the wheel bearing outer race and the wheel bearing inner race.

In another preferred embodiment, a boot unit fixing part may be formed integrally with the wheel bearing outer race, and the second end of the boot unit may be coupled to the boot unit fixing part.

In still another preferred embodiment, the joint bearing may include a joint bearing outer race coupled to the first end of the boot unit, a joint bearing inner race coupled to the outer part of the shaft, and a plurality of joint bearing balls rotatably disposed between the joint bearing outer race and the joint bearing inner race.

In yet another preferred embodiment, the joint may include a joint inner race coupled to the shaft so as to be rotated integrally with the shaft, and a joint outer race formed integrally with the axle housing, and rotated integrally with the joint inner race through a plurality of joint balls disposed between the joint outer race and the joint inner race.

In still yet another preferred embodiment, the joint bearing inner race may be coupled to an outer part of a joint inner race extension formed integrally with the joint inner race and disposed on an outer circumferential surface of the shaft.

In a further preferred embodiment, a boot seal may be mounted between an outer circumferential surface of the axle housing and an inner circumferential surface of the boot unit, and the boot seal may be disposed at a position between the wheel bearing and the joint bearing so as to prevent the lubricant from flowing towards a space between the boot seal and the wheel bearing.

In another further preferred embodiment, the boot unit may include a first boot member configured to have a first end airtightly coupled to an outer part of the joint bearing outer race, and a second boot member configured to have a first end airtightly coupled to a second end of the first boot member and a second end airtightly coupled to an outer part of the wheel bearing outer race.

In still another further preferred embodiment, a lock nut may be coupled to the outer circumferential part of the axle housing, and when the wheel bearing inner race is coupled to the outer circumferential surface of the axle housing, the wheel bearing inner race may be pressed against an engaging protrusion of the axle housing by the lock nut so as to support the wheel bearing inner race.

In yet another further preferred embodiment, a forming part having a shape bent so as to protrude outwards in a radial direction of the axle housing may be formed at one end of the axle housing, and when the wheel bearing inner race is coupled to the outer circumferential part of the axle housing, the wheel bearing inner race may be pressed against an engaging protrusion of the axle housing by the forming part so as to support the wheel bearing inner race.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
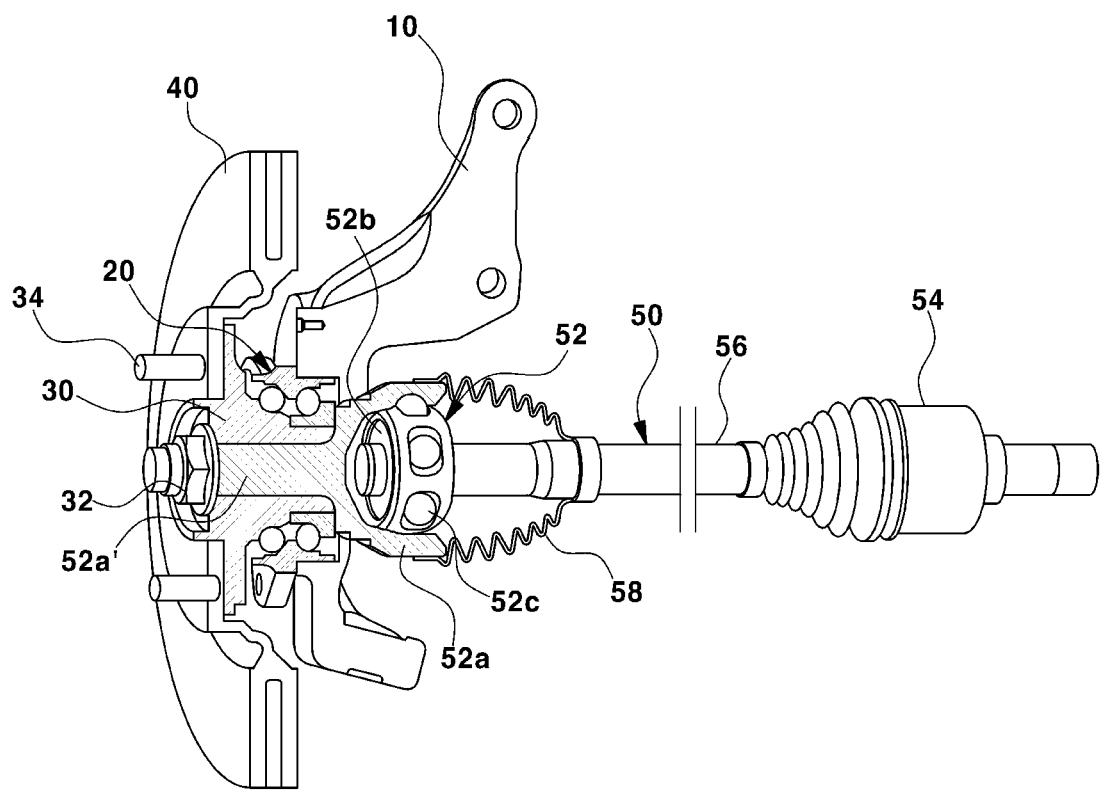
FIG. 1 (RELATED ART) is a view illustrating a conventional axle assembly for a driving wheel using a drive shaft.
Figure 2:
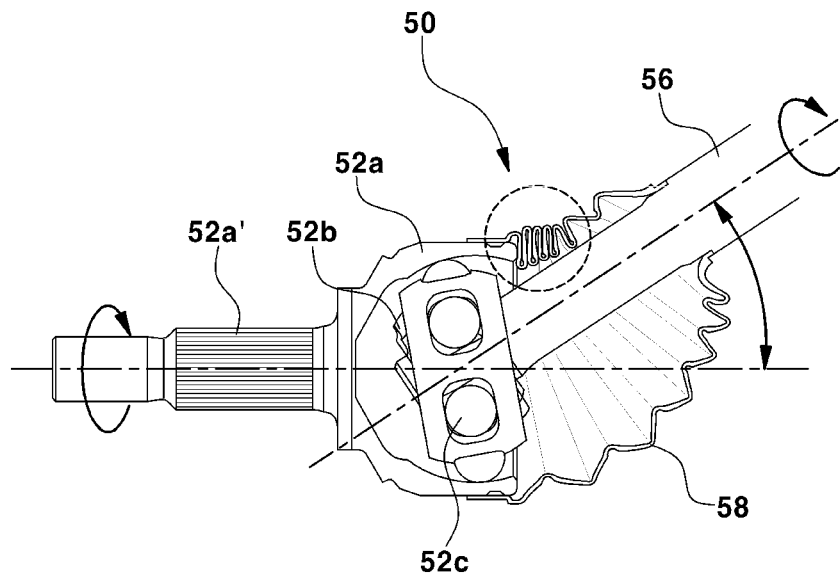
FIG. 2 (RELATED ART) is a view illustrating the state in which an angle is formed between a joint outer race and a shaft of the drive shaft when turning while driving.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be within the spirit and scope of the disclosure as defined by the appended claims.

Figure 3:
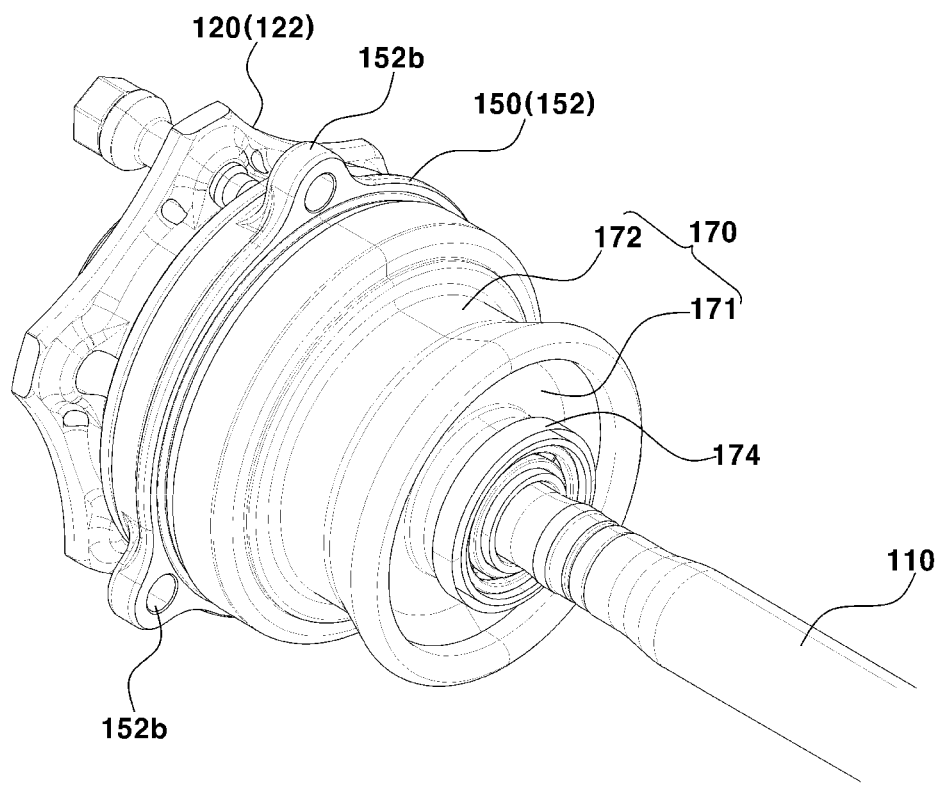
FIG. 3 is a perspective view of an axle assembly for a driving wheel according to one embodiment of the present disclosure.
Figure 4:
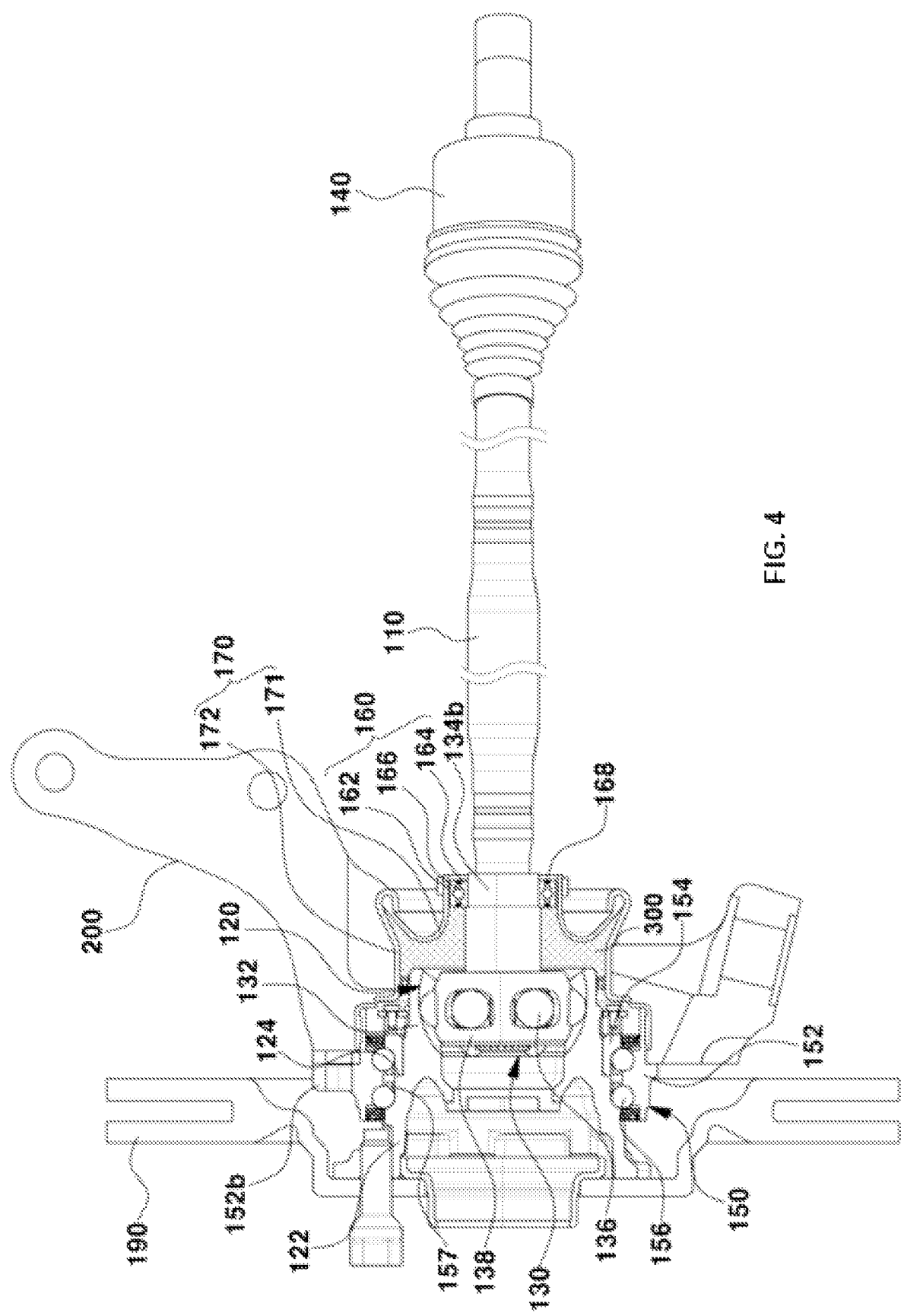
FIGS. 4 and 5 are cross-sectional views illustrating some elements of the axle assembly according to one embodiment of the present disclosure.
Figure 5:
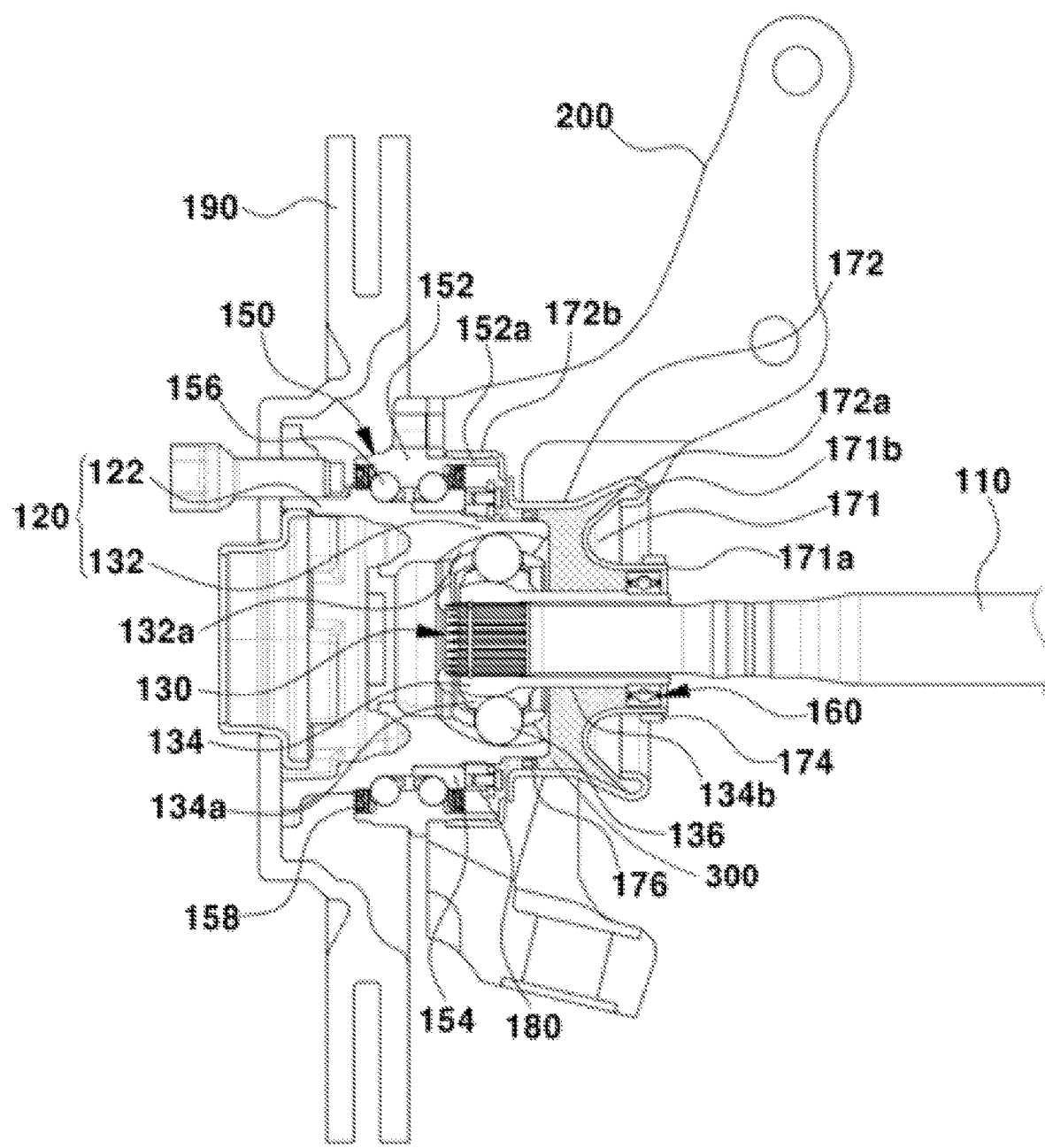

FIG. 3 is a perspective view of an axle assembly for a driving wheel according to one embodiment of the present disclosure, and FIGS. 4 and 5 are cross-sectional views illustrating some elements of the axle assembly according to one embodiment of the present disclosure.

As shown in FIGS. 3 to 5, the axle assembly according to the present disclosure includes a shaft 110, an axle housing 120, a wheel bearing 150, a joint bearing 160 and a boot unit 170.

The shaft 110 serves to receive driving force from a powertrain (not shown) of a vehicle and to transmit the driving force to the driving wheel, and the shaft 110 receives driving force generated by the powertrain through a powertrain-side joint 140 coupled to a first end of the shaft 110 in the axial direction thereof, and transmits the driving force of the powertrain to the driving wheel through a wheel-side joint 130 coupled to a second end of the shaft 110.

The shaft 110, the wheel-side joint 130 and the powertrain-side joint 140 may serve as a general drive shaft. Here, the wheel-side joint 130 may be a constant velocity joint. In particular, the wheel-side joint 130 connects the axle housing 120 and the shaft 110 so that the axle housing 120 and the shaft 110 may be rotated integrally.

The axle housing 120 is disposed so as to pass through a center of a steering knuckle 200 connected to a steering apparatus (not shown) of the vehicle, and is coupled to the shaft 110 through the wheel-side joint 130 so as to be rotated integrally with the shaft 110.

Specifically, the axle housing 120 includes a joint outer race 132 serving as an outer race of the wheel-side joint 130, and a wheel hub 122 to which a wheel disc 190 is coupled through bolts.

In particular, the axle housing 120 has a structure in which the joint outer race 132 and the wheel hub 122 are integrated. Therefore, the axle housing 120 may serve both as a general wheel hub and as the joint outer race 132.

The wheel hub 122 is a part on which the wheel disc 190 and a wheel (not shown) are mounted. The wheel disc 190 is coupled to the wheel hub 122, and may thus be disposed at an outer circumferential part of the axle housing 120 and be rotated integrally with the axle housing 120.

The axle housing 120 is coupled to the steering knuckle 200 through the wheel bearing 150.

The wheel bearing 150 is mounted between the steering knuckle 200 and the axle housing 120, and serves to support the axle housing 120 passing through the center of the steering knuckle 200 so that the axle housing 120 is rotatable independently of the steering knuckle 200.

In particular, the wheel bearing 150 may include a wheel bearing outer race 152, a wheel bearing inner race 154, and a plurality of wheel bearing balls 156.

The wheel bearing outer race 152 is coupled to one side of the steering knuckle 200 using bolts, and here, a portion of the wheel bearing outer race 152 may be press-fitted into the steering knuckle 200. In particular, the wheel bearing outer race 152 may have a knuckle coupling part 152b which is coupled to the steering knuckle 200, and the knuckle coupling part 152b may protrude from the outer part of the wheel bearing outer race 152 in the radial direction thereof.

The wheel bearing inner race 154 is mounted on the outer circumferential part of the axle housing 120, and the wheel bearing balls 156 are disposed between the wheel bearing outer race 152 and the wheel bearing inner race 154 so as to be rotatable. Therefore, the wheel bearing outer race 152 may rotatably support the wheel bearing inner race 154 through the wheel bearing balls 156 which are arranged in the circumferential direction of the wheel bearing 150.

Here, the wheel bearing balls 156 may be arranged in two rows in the axial direction of the wheel bearing 150, the wheel bearing balls 156 in one row (referred to as first wheel bearing balls 156) may be disposed between the wheel bearing outer race 152 and the wheel bearing inner race 154, and the wheel bearing balls 156 in the other row (referred to as second wheel bearing balls 156) may be disposed between the wheel bearing outer race 152 and the outer circumferential surface of the axle housing 120.

The wheel bearing 150 may include one side part of the axle housing 120 serving as a bearing inner race and, in this case, the wheel bearing 150 shares the one side part of the axle housing 120 with the axle housing 120.

When the wheel bearing 150 is coupled to the steering knuckle 200, the wheel bearing 150 rotatably supports the axle housing 120.

Further, when the wheel bearing inner race 154 is preloaded by a lock nut 180 coupled to the outer circumferential surface of the axle housing 120, the wheel bearing inner race 154 may be supported.

The lock nut 180 is fixedly coupled to the outer circumferential surface of the axle housing 120 through threads formed on an inner circumferential surface of the lock nut 180. When the lock nut 180 is tightened onto the outer circumferential surface of the axle housing 120, the lock nut 180 adjacent to the wheel bearing inner race 154 applies a pre-load to the wheel bearing inner race 154, and as a result, the wheel bearing inner race 154 is fixed so as not to be released from the outer circumferential surface of the axle housing 120.

Here, the wheel bearing inner race 154 is located between an engaging protrusion 124 of the axle housing 120 and the lock nut 180, one side of the wheel bearing inner race 154 is supported by the lock nut 180, and the other side of the wheel bearing inner race 154 is supported by the engaging protrusion 124. That is to say, when the wheel bearing inner race 154 is coupled to the outer circumferential part of the axle housing 120, the wheel bearing inner race 154 is pressed against the engaging protrusion 124 by the lock nut 180, thereby being supported.

The engaging protrusion 124 is formed at one side part of the axle housing 120 (a part of the axle housing 120 serving as the inner race of the wheel bearing 150), and the wheel bearing inner race 154 mounted on the outer circumferential surface of the axle housing 120 and the engaging protrusion 124 have the same height in the radial direction thereof.

Figure 6:
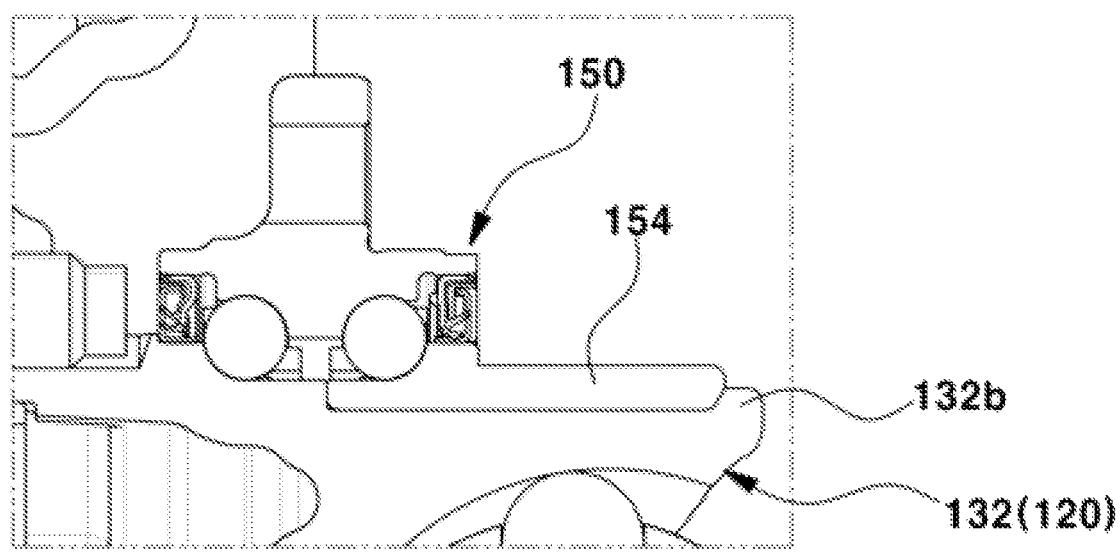
FIG. 6 is a view illustrating a structure for fixing a wheel bearing according to another embodiment of the present disclosure.

Referring to another embodiment shown in FIG. 6, the wheel bearing inner race 154 may be pressed and supported by a forming part 132b of the axle housing 120 instead of the lock nut 180, and thus be fixed to the outer circumferential surface of the axle housing 120.

The forming part 132b may be formed at one end of the axle housing 120 through an orbital forming process.

In particular, the forming part 132b may be formed at one end of the joint outer race 132 of the axle housing 120 through the orbital forming process, and be formed in a shape bent so as to protrude outwards in the radial direction from the end of the joint outer race 132.

Here, the forming part 132b is bent so as to tightly surround the end of the wheel bearing inner race 154 coupled to the outer circumferential surface of the axle housing 120, and presses the wheel bearing inner race 154 against the engaging protrusion 124 so as to support the wheel bearing inner race 154.

The forming part 132b contacts one side end part of the wheel bearing inner race 154 and thus presses the wheel bearing inner race 154 against the engaging protrusion 124, thereby being capable of preventing the wheel bearing inner race 154 from being released from the axle housing 120 in the same manner as the lock nut 180.

Further, in FIGS. 4 and 5, reference numeral 157 indicates a cage 157 of the wheel bearing 150, and reference numeral 158 indicates a bearing seal 158 of the wheel bearing 150. The rage 157 may be disposed between the wheel bearing inner race 154 and the wheel bearing outer race 152 and serve to restrict the positions of the wheel bearing balls 156. The bearing seal 158 serves to seal a lubricant 300 injected into a space between the wheel bearing outer race 152 and the wheel hearing inner race 154 so as to allow the wheel bearing balls 156 to move smoothly.

Figure 7:
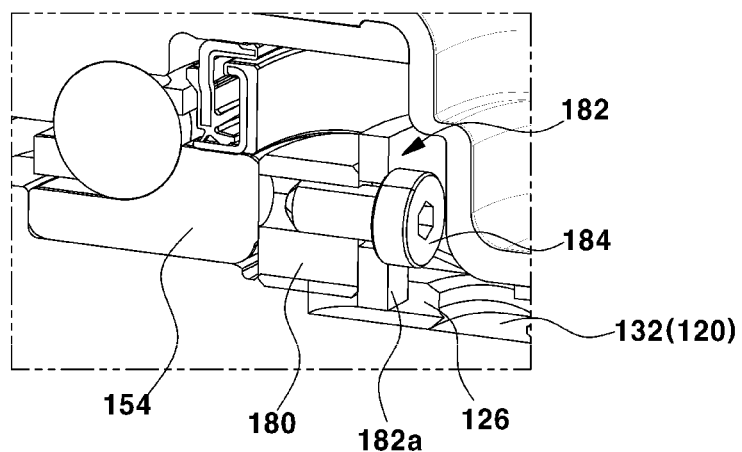
FIG. 7 is a view illustrating a structure for preventing loosening of a lock nut according to one embodiment of the present disclosure.

Referring to FIG. 7, a loosening prevention ring 182 may be coupled to the lock nut 180 through bolt members 184. In this case, at least one engaging protrusion 182a is formed on the inner part of the loosening prevention ring 182 in the radial direction thereof, and the engaging protrusion 182a is inserted into a groove 126 formed in the outer circumferential surface of the axle housing 120. In particular, the engaging protrusion 182a is inserted into the groove 126 formed in an outer circumferential surface of the joint outer race 132 of the axle housing 120.

When the lock nut 180 is coupled to the outer circumferential surface of the axle housing 120, rotation of the lock nut 180 is prevented by inserting the engaging protrusion 182a into the groove 126. Therefore, the loosening prevention ring 182 may prevent the lock nut 180 from being loosened from the outer circumferential surface of the axle housing 120.

Further, the wheel-side joint 130 includes a joint inner race 134, the joint outer race 132, and a plurality of joint balls 136 arranged in the circumferential direction of the wheel-side joint 130.

The joint inner race 134 is spline-coupled to one end of the shaft 110 so as to be rotated integrally with the shaft 110, and the joint outer race 132 is coupled to the joint inner race 134 through the joint balls 136 so as to be axially rotated integrally with the joint inner race 134.

In particular, the joint outer race 132 is formed integrally with the wheel hub 122 of the axle housing 120, and is rotated integrally with the shaft 110 by receiving the rotating force of the shaft 110 through the joint balls 136.

The joint balls 136 are disposed between the joint outer race 132 and the joint inner race 134, and transmit the rotating force of the joint inner race 134 to the joint outer race 132. For this purpose, outer race grooves 132a, in which the joint balls 136 are mounted so as to be rotated integrally with the joint outer race 132, are formed in the outer race 132, and inner race grooves 134a, in which the joint balls 136 are mounted so as to be rotated integrally with the joint inner race 134, is formed in the joint inner race 134.

In particular, the outer race grooves 132a are formed in an inner circumferential surface of the joint outer race 132 so as to extend in the axial direction, and the inner race grooves 134a are formed in an outer circumferential surface of the joint inner race 134 so as to extend in the axial direction. Therefore, even when the the shaft 110 is bent relative to the axle housing 120 and thus an angle is formed between the shaft 110 and the axle housing 120, the joint balls 136 may connect the joint outer race 132 and the joint inner race 134 so that the joint outer race 132 and the joint inner race 134 are rotated integrally.

Further, a cage 138 disposed outside the joint inner race 134 prevents the joint balls 136 from being released from the outer race grooves 132a and the inner race grooves 134a. Here, the cage 138 is disposed so as not to interfere with the motion of the joint balls 136 for transmitting rotating force.

The joint bearing 160 is mounted on the outer part of the shaft 110.

The joint bearing 160 is mounted on the outer part of the shaft 110 so as to be spaced apart from the wheel-side joint 130 coupled to one end of the shaft 110 by a designated distance, and includes a joint bearing outer race 162, a joint bearing inner race 164, and a plurality of joint bearing balls 166 arranged in the circumferential direction of the joint bearing 160.

The joint bearing inner race 164 is coupled to the outer part of the shaft 110 at a position spaced apart from the wheel-side joint 130 by a designated distance so as to be rotated integrally with the shaft 10. In particular, the joint bearing inner race 164 may be coupled to the outer part of a joint inner race extension 134b so as to be rotated integrally with the joint inner race extension 134b.

The joint inner race extension 134b extends integrally from one end of the joint inner race 134, and is formed to contact an outer circumferential surface of the shaft 110 at the end of the joint inner race 134.

The joint bearing inner race 164 may be forcibly inserted into outer part of the joint inner race extension 134b, and thus prevent leakage of a lubricant filling a space between the joint bearing inner race 164 and the wheel-side joint 130.

Although the joint bearing inner race 164 may be airtightly mounted on the outer circumferential surface of the shaft 110 so as to prevent leakage of the lubricant 300, in order to facilitate separation of the shaft 110 from the joint bearing inner race 164, the joint bearing inner race 164 may be mounted on the outer part of the joint inner race extension 134 b.

The joint bearing inner race 164 is rotatably supported by the joint bearing outer race 162 through the joint bearing balls 166 which are rotatably disposed between the joint bearing outer race 162 and the joint bearing inner race 164. Here, the joint bearing outer race 162 is coupled to the steering knuckle 200 through the wheel bearing outer race 152 and the boot unit 170.

The joint bearing outer race 162 is not coupled to the axle housing 120 or to the wheel bearing inner race 154 but is coupled to the steering knuckle 200, and is thus not rotated together with the shaft 110 when the shaft 110 is rotated.

In particular, the joint bearing outer race 162 may be coupled to a first end 171a of the boot unit 170, and be fixed to the steering knuckle 200. Here, the joint bearing outer race 162 may be airtightly coupled to the first end 171a of the boot unit 170 through a band 174.

The band 174 is a ring-type member formed of an elastic material, and may be elastically mounted at the first end 171a of the boot unit 170 disposed on the outer part of the joint bearing outer race 162. Here, the band 174 is surrounded by the outer part of the first end 171a of the boot unit 170, and is pressed against the joint bearing outer race 162.

The boot unit 170 has a second end 172b disposed at a position opposite the first end 171a in the axial direction of the shaft 110. The second end 172b is airtightly coupled to the wheel bearing outer race 152.

Therefore, the boot unit 170 is formed to surround a space, which is filled with the lubricant 300, at the outer part of the shaft 110.

The boot unit 170 may include a first boot member 171 and a second boot member 172 which are coupled to each other. Here, the first boot member 171 and the second boot member 172 may be formed by molding using elastic materials.

The first boot member 171 may be formed in the shape of a U-type plate, one end (i.e., the first end) of the first boot member 171 may be coupled to the joint bearing outer race 162, and the other end (i.e., the second end) of the first boot member 171 may be coupled to a caulking coupling part 172a of the second boot member 172. Here, the first end of the first boot member 171 is the first end 171a of the boot unit 170, and the second end of the first boot member 171 is a caulked coupling part 171b.

The second boot member 172 may be formed in a pipe shape, one end (i.e., the first end) of the second boot member 172 may be coupled to the caulked coupling part 171b of the first boot member 171, and the other end (i.e., the second end) of the second boot member 172 may be coupled to a boot unit fixing part 152a of the wheel bearing outer race 152. Here, the second end of the second boot member 172 is the second end 172b of the boot unit 170, and the first end of the second boot member 172 is the caulking coupling part 172a.

The boot unit fixing part 152a extends integrally from a shaft-side end of the wheel bearing outer race 152.

The second end 172b of the second boot member 172 is tightly coupled to the the outer side of the boot unit fixing part 152a without a gap therebetween through a caulking process, and the first end of the second boot member 172, i.e., the caulking coupling part 172a, is coupled to the second end of the first boot member 171, i.e., the caulked coupling part 171b. The caulking coupling part 172a surrounds and is tightly coupled to the caulked coupling part 171b without a gap therebetween through the caulking process.

The above-configured boot unit 170 has a structure acquired by removing peaks and troughs from a conventional boot.

Further, in order tor strict the flow of the lubricant 300 within a space surrounded by the boot unit 170 (i.e., a space filled with the lubricant 300) between the wheel bearing 150 and the joint bearing 160, a boot seal 176 is mounted between the outer circumferential surface of the axle housing 120 and an inner circumferential surface of the boot unit 170.

Described concretely, the boot seal 176 is airtightly mounted between an inner circumferential surface of the second boot member 172 and the outer circumferential surface of the joint outer race 132.

Here, the boot seal 176 is disposed at a position between the wheel bearing 150 and the joint bearing 160, and thus restricts the flow of the lubricant 300 to the inside of a space between the boot seal 176 and the joint bearing 160. That is, the boot seal 176, which is disposed at the position between the wheel bearing 150 and the joint bearing 160, may prevent the lubricant 300 from flowing to a space between the boot seal 176 and the wheel bearing 150.

The space surrounded by the boot unit 170 is filled with the lubricant 300 so as to allow the wheel-side joint 130 to move smoothly when the shaft 110 is rotated. When the lubricant 300 flows towards the wheel bearing 150 due to centrifugal force and moves to a space outside the joint outer race 132 in the radial direction (i.e., a space between the boot seal 176 and the wheel bearing 150), lubrication performance is degraded, and thus an unnecessarily large amount of the lubricant 300 must be used to fill the space surrounded by the boot unit 170 in consideration of such degradation of the lubrication performance.

Therefore, the flow of the lubricant 300 may be restricted to the space between the boot seal 176 and the joint bearing 160 using the boot seal 176.

Further, in FIGS. 4 and 5, reference numeral 168 indicates a seal 168 of the joint bearing 160.

The seal 168 may serve to seal the lubricant 300 injected into a space between the joint bearing outer race 162 and the joint bearing inner race 164 so as to allow the joint bearing balls 166 to move smoothly.

Figure 8:
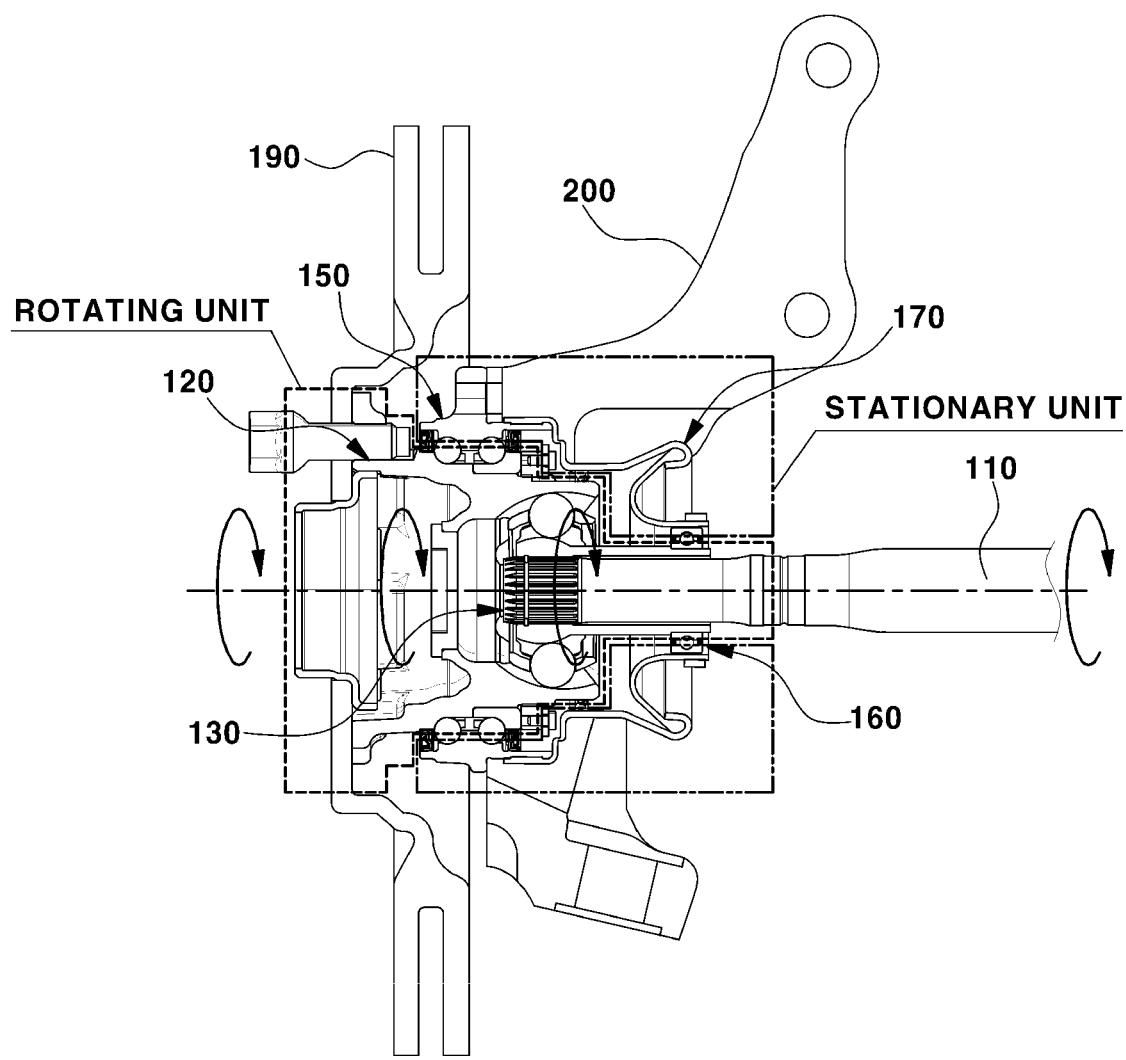
FIG. 8 is a view illustrating the state in which an axle housing is rotated independently of a boot unit when a shaft of the axle assembly according to one embodiment of the present disclosure is rotated.

In the axle assembly having the above configuration according to the present disclosure, as shown in FIG. 8, a rotating unit and a stationary unit are connected through the wheel bearing 150 and the joint bearing 160, and thus the rotating unit may be rotated independently of the stationary unit.

Here, the rotating unit includes the shaft 110, the axle housing 120, and the elements coupled to the axle housing 120 so as to be rotated integrally with the axle housing 120, and the stationary unit includes the elements to which the rotating force of the rotating unit is not applied by the wheel bearing 150 and the joint bearing 160. In particular, the stationary unit includes the boot unit 170, the steering knuckle 200, etc.

Since the boot unit 170 is not rotated integrally with the rotating unit, that is, the boot unit 170 is not rotated but maintains the state of being fixed to the steering knuckle 200 when the rotating unit is rotated, friction noise generated in the conventional boot may be eliminated, and as a result, durability of the boot unit 170 may be greatly improved and it is not necessary to apply a separate coating agent for preventing friction noise to the surface of the boot unit 170.

Further, even in the situation in which the shaft 110 is bent relative to the axial direction of the axle housing 120 and thus an angle is formed between the shaft 110 and the axial direction of the axle housing 120, the boot unit 170 is merely deformed, that is, bent, in response to such an angle of the shaft 110 relative to the axial direction of the axle housing 120, but is not rotated integrally with the shaft 110.

As is apparent from the above description, an axle assembly for a driving wheel of a vehicle according to the present disclosure, in which a boot unit is not rotated integrally with a shaft, may eliminate friction noise generated in the conventional boot when turning while driving, thereby greatly improving durability of the boot unit.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:
1. An axle assembly for a driving wheel of a vehicle, comprising:

a shaft rotated by receiving driving force from a powertrain and configured to rotate a wheel disc connected thereto;

an axle housing disposed to pass through a center of a steering knuckle connected to a steering apparatus, and coupled to the shaft through a joint so as to be rotated integrally with the shaft, wherein the axle housing is fixed to the wheel disc and coaxially disposed with the wheel disc;

a wheel bearing mounted between the steering knuckle and the axle housing;

a joint bearing mounted on an outer part of the shaft so as to be spaced apart from the joint by a designated distance; and a boot unit configured to have a first end coupled to an outer race of the joint bearing and a second end coupled to an outer race of the wheel bearing so as to form a space filled with a lubricant outside the shaft.

2. The axle assembly of claim 1, wherein the wheel bearing comprises:

the wheel bearing outer race coupled to the steering knuckle;

a wheel bearing inner race mounted on an outer circumferential part of the axle housing; and a plurality of wheel bearing balls rotatably disposed between the wheel bearing outer race and the wheel bearing inner race.

3. The axle assembly of claim 2, wherein a boot unit fixing part is formed integrally with the wheel bearing outer race, and the second end of the boot unit is coupled to the boot unit fixing part.

4. The axle assembly of claim 2, wherein the joint bearing comprises:

the joint bearing outer race coupled to the first end of the boot unit;

a joint bearing inner race coupled to the shaft; and a plurality of joint bearing balls rotatably disposed between the joint bearing outer race and the joint bearing inner race.

5. The axle assembly of claim 4, wherein the joint comprises:

a joint inner race coupled to the shaft so as to be rotated integrally with the shaft; and a joint outer race formed integrally with the axle housing, and rotated integrally with the joint inner race through a plurality of joint balls disposed between the joint outer race and the joint inner race.

6. The axle assembly of claim 5, wherein the joint bearing inner race is coupled to the shaft through a joint inner race extension formed integrally with the joint inner race and disposed between the joint bearing inner race and the shaft.

7. The axle assembly of claim 4, wherein the boot unit comprises:

a first boot member configured to have a first end airtightly coupled to an outer part of the joint bearing outer race; and a second boot member configured to have a first end airtightly coupled to a second end of the first boot member and a second end airtightly coupled to an outer part of the wheel bearing outer race.

8. The axle assembly of claim 2, wherein a lock nut is coupled to the outer circumferential part of the axle housing, and when the wheel bearing inner race is coupled to the outer circumferential part of the axle housing, the wheel bearing inner race is pressed against an engaging protrusion of the axle housing by the lock nut.

9. The axle assembly of claim 2, wherein a forming part having a shape bent so as to protrude outwards in a radial direction of the axle housing is formed at one end of the axle housing, and when the wheel bearing inner race is coupled to the outer circumferential part of the axle housing, the wheel bearing inner race is pressed against an engaging protrusion of the axle housing by the forming part.

10. The axle assembly of claim 1, wherein a boot seal is mounted between an outer circumferential surface of the axle housing and an inner circumferential surface of the boot unit, and the boot seal is disposed at a position between the wheel bearing and the joint bearing so as to prevent the lubricant from flowing towards a space between the boot seal and the wheel bearing.

\* \* \* \* \*